United States Patent
Lee et al.

(10) Patent No.: US 10,547,198 B2
(45) Date of Patent: Jan. 28, 2020

(54) WIRELESS CHARGING SYSTEM OF USING MULTI-FREQUENCY FOR WIRELESS CHARGING AT LONG AND SHORT DISTANCE

(71) Applicant: CENTER FOR INTEGRATED SMART SENSORS FOUNDATION, Daejeon (KR)

(72) Inventors: Kyung Hak Lee, Daejeon (KR); Hyun Wook Lee, Daejeon (KR); Young Ki Kim, Daejeon (KR); Chong Min Kyung, Daejeon (KR)

(73) Assignee: CENTER FOR INTEGRATED SMART SENSORS FOUNDATION, Daejeon (KR)

( * ) Notice: Subject to any disclaimer, the term of this patent is extended or adjusted under 35 U.S.C. 154(b) by 118 days.

(21) Appl. No.: 15/643,088

(22) Filed: Jul. 6, 2017

(65) Prior Publication Data
US 2018/0013313 A1    Jan. 11, 2018

(30) Foreign Application Priority Data
Jul. 8, 2016   (KR) .................. 10-2016-0086976

(51) Int. Cl.
| H02J 7/00 | (2006.01) |
| H02J 7/02 | (2016.01) |
| H02J 50/40 | (2016.01) |

(52) U.S. Cl.
CPC .............. *H02J 7/025* (2013.01); *H02J 7/007* (2013.01); *H02J 50/40* (2016.02)

(58) Field of Classification Search
USPC ................................ 320/107, 108, 109, 110
See application file for complete search history.

(56) References Cited

U.S. PATENT DOCUMENTS

| 2011/0127845 A1* | 6/2011 | Walley .................... H02J 5/005 |
| | | 307/104 |
| 2011/0127951 A1* | 6/2011 | Walley .................... H02J 7/025 |
| | | 320/108 |

(Continued)

FOREIGN PATENT DOCUMENTS

| KR | 10-2013-0060355 A | 6/2013 |
| KR | 10-2016-0024366 A | 3/2016 |
| KR | 10-2016-0046913 A | 4/2016 |

OTHER PUBLICATIONS

Korean Office Action, dated Jul. 27, 2017, for Korean Application No. 10-2016-0086976, 4 pages.

*Primary Examiner* — Brian Ngo
(74) *Attorney, Agent, or Firm* — Seed Intellectual Property Law Group LLP

(57) ABSTRACT

Disclosed is a wireless charging system of using multi-frequency including at least one transmitter and at least one receiver which is wirelessly charged by the at least one transmitter, wherein the at least one transmitter includes a signal generator configured to generate a power signal of each of a plurality of frequency bands; a plurality of matching units connected to the signal generator matching and outputting the power signal of each of the plurality of frequency bands; and at least one antenna connected to the plurality of matching units transmitting the power signal of each of the plurality of frequency bands to each of at least one receiver, and wherein the at least one receiver includes at least one antenna receiving a power signal of each of a plurality of frequency bands from each of at least one transmitter; a plurality of matching units connected to the at least one antenna matching and outputting the power signal of each of the plurality of frequency bands; and a plurality of rectifiers connected to the plurality of matching units (Continued)

rectifying AC power applied to the power signal of each of the plurality of frequency bands to DC power.

7 Claims, 12 Drawing Sheets

(56) References Cited

U.S. PATENT DOCUMENTS

| | | | |
|---|---|---|---|
| 2012/0157021 A1* | 6/2012 | Moon | H01Q 1/248 |
| | | | 455/127.2 |
| 2015/0076921 A1* | 3/2015 | Park | H02J 50/12 |
| | | | 307/104 |
| 2015/0270740 A1* | 9/2015 | Lee | H04B 5/0037 |
| | | | 320/108 |
| 2016/0261233 A1* | 9/2016 | Pohl | H01F 38/14 |
| 2016/0341821 A1* | 11/2016 | Wang | B60L 53/60 |
| 2017/0208597 A1* | 7/2017 | Gollakota | H04L 12/10 |
| 2018/0013313 A1* | 1/2018 | Lee | H02J 50/40 |
| 2018/0166915 A1* | 6/2018 | Afridi | H02J 50/05 |
| 2018/0309326 A1* | 10/2018 | Lee | H02J 50/12 |

\* cited by examiner

100

WIRELESS CHARGING SYSTEM OF USING MULTI-FREQUENCY FOR WIRELESS CHARGING AT LONG AND SHORT DISTANCE

This application claims the priority benefit of Korean Patent Application No. 10-2016-0086976, filed on Jul. 8, 2016, in the Korean Intellectual Property Office, the disclosure of which is incorporated herein by reference.

BACKGROUND

1. Field of the Invention

The following example embodiments relate to a wireless charging system of using multi-frequency for wireless charging at long and short distance, and more particularly, to technology charging a plurality of receivers to improve charging efficiency by using power signal of each of a plurality of frequency bands.

2. Description of the Related Art

Recently as various mobile terminals using wireless communication are widely distributed, a wireless charging technology wirelessly charging mobile terminals also is actively developed.

A wireless charging technology, as a technology charging a mobile terminal according to a power signal transmitted from a wireless charging transmitter, receives the power signal to be used for charging in the mobile terminal from the wireless charging transmitter by embedding a wireless power receiver in the mobile terminal based on any one method of an induction method, a resonance method, or a RF wireless charging method.

Since the existing wireless charging technology uses only a single frequency band between the wireless charging transmitter and the wireless charging receiver, there is a disadvantage that it may be used only at short distance because the power is limited.

Accordingly, the following example embodiments propose a technology capable of wireless charging at long distance without limitation of power by using a power signal of each of a plurality of frequency bands.

SUMMARY

At least one example embodiment provides a wireless charging system using a power signal of each of a plurality of frequency.

In detail, at least one example embodiment provides at least one transmitter transmitting a power signal of each of a plurality of frequency to at least one receiver, and in response thereto provides at least one receiver using for charging by receiving power signal by each of the plurality of frequency.

In other words, at least one example embodiment provides a wireless charging system using all of the power signal of each of the plurality of frequency bands in a process of charging by transmitting and receiving the power signal from the plurality of frequency bands.

According to an aspect of at least one example embodiment, there is provided at least one transmitter used in a wireless charging system of using multi-frequency including a signal generator configured to generate a power signal of each of a plurality of frequency bands; a plurality of matching units connected to the signal generator matching and outputting the power signal of each of the plurality of frequency bands; and at least one antenna connected to the plurality of matching units transmitting the power signal of each of the plurality of frequency bands to each of at least one receiver.

Each of the plurality of matching units may be provided corresponding to the power signal of each of the plurality of frequency bands.

The one antenna may have different feeding positions for the power signal of each of the plurality of frequency bands when the at least one antenna is provided one.

The at least one transmitter may further include a frequency information receiving unit configured to receive frequency information from the at least one receiver, and the signal generator may selectively generate the power signal of each of the plurality of frequency bands based on the frequency information transmitted from the frequency information receiving unit.

The at least one transmitter may further include at least one power amplifier located between the signal generator and the plurality of matching units and amplifying the power signal of each of the plurality of frequency bands.

When the at least one power amplifier is provided in multiple numbers, each of the plurality of power amplifiers may be provided corresponding to the number of the plurality of matching units, and the at least one transmitter may further include a switch located between the signal generator and the plurality of power amplifiers and selectively transmitting the power signal of each of the plurality of frequency bands to the plurality of the power amplifiers.

Each of a plurality of antennas may be provided corresponding to the power signal of each of the plurality of frequency bands when the at least one antenna is provided in multiple numbers.

According to an aspect of an example embodiment, at least one receiver used in a wireless charging system of using multi-frequency may include at least one antenna receiving a power signal of each of a plurality of frequency bands from each of at least one transmitter; a plurality of matching units connected to the at least one antenna matching and outputting the power signal of each of the plurality of frequency bands; and a plurality of rectifiers connected to the plurality of matching units rectifying AC (alternating current) power applied to the power signal of each of the plurality of frequency bands to DC (direct current) power.

Each of the plurality of rectifiers and each of the plurality of matching units may be provided corresponding to the power signal of each of the plurality of frequency bands.

The one antenna may have different feeding positions for the power signal of each of the plurality of frequency bands when the at least one antenna is provided one.

Each of a plurality of antennas may be provided corresponding to the power signal of each of the plurality of frequency bands when the at least one antenna is provided in multiple numbers.

The at least one receiver may further include a switch located between the at least one antenna and the plurality of matching units and selectively transmitting the power signal of each of the plurality of frequency bands transmitted from the at least one antenna to the plurality of matching units.

The at least one receiver may further include a booster connected to each of the plurality of rectifiers and converting DC power of the power signal of each of the plurality of frequency bands to DC power suitable for charging.

According to an aspect of an example embodiment, a wireless charging system of using multi-frequency includes at least one transmitter and at least one receiver charged wirelessly by the at least one transmitter, wherein the at least one transmitter includes a signal generator configured to generate a power signal of each of a plurality of frequency bands; a plurality of matching units connected to the signal generator matching and outputting the power signal of each of the plurality of frequency bands; and at least one antenna connected to the plurality of matching units and transmitting the power signal of each of the plurality of frequency bands to each of the at least one receiver, wherein the at least one receiver includes at least one antenna receiving the power signal of each of the plurality of frequency bands from each of the at least one transmitter; a plurality of matching units connected to the at least one antenna and matching and outputting the power signal of each of the plurality of frequency bands; and a plurality of rectifiers connected to the plurality of matching units and rectifying AC power applied to the power signal of each of the plurality of frequency bands to DC power.

Each of the plurality of matching units included in the at least one transmitter may be provided corresponding to the power signal of each of the plurality of frequency bands.

Each of the plurality of rectifiers and each of the plurality of matching units included in the at least one receiver may be provided corresponding to the power signal of each of the plurality of frequency bands.

According to example embodiments, there may be provided a wireless charging system using a power signal of each of a plurality of frequency.

In detail, according to example embodiments, there may be provided at least one transmitter transmitting a power signal of each of a plurality of frequency to at least one receiver, and in response thereto provides at least one receiver using for charging by receiving the power signal by each of the plurality of frequency.

In other words, according to example embodiments, there may be provided a wireless charging system using all of the power signal of each of the plurality of frequency bands in a process of charging by transmitting and receiving the power signal from each of the plurality of frequency bands.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
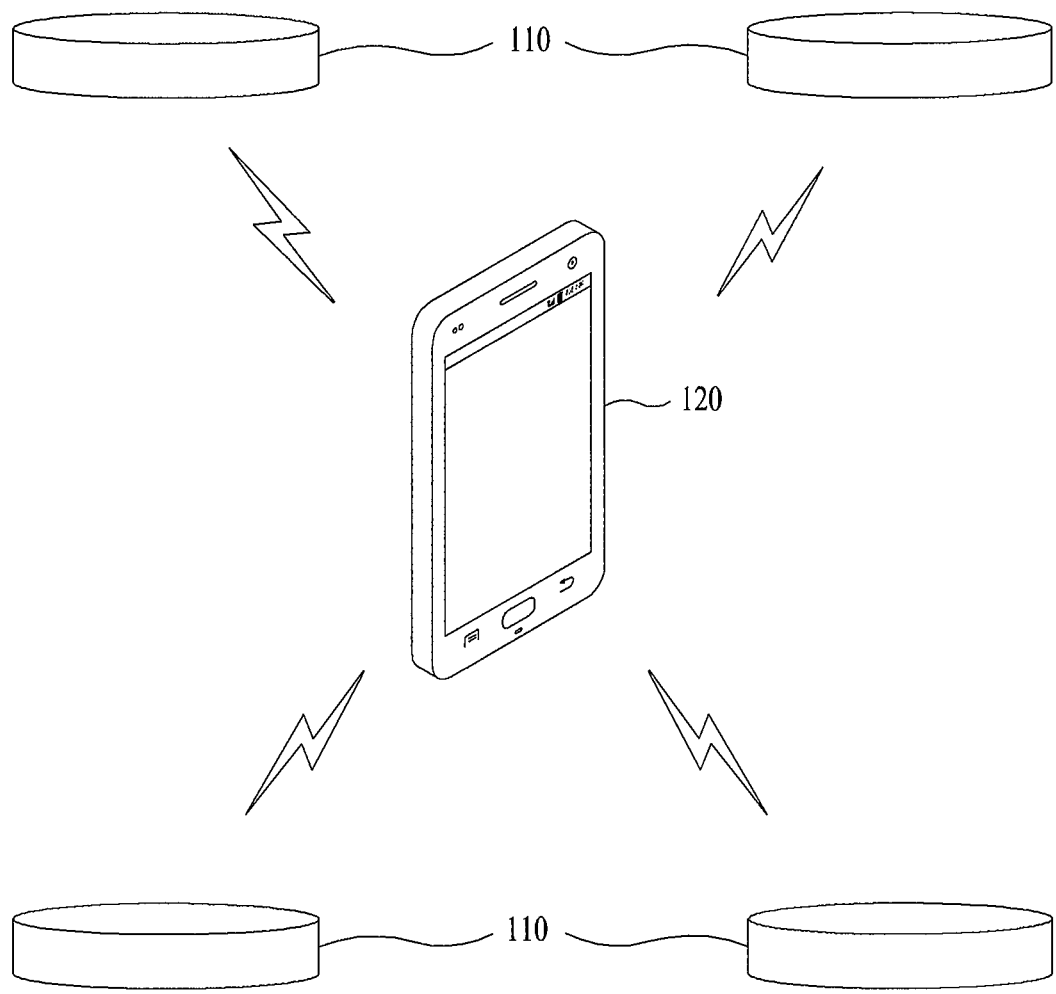
FIG. 1 illustrates an example of a wireless charging system according to an example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

Also, terminologies used herein refer to terms used to appropriately represent the example embodiments and may vary based on a reader, the intent of an operator, or custom of a field to which this disclosure belongs, and the like. Accordingly, the definition of the terms should be made based on the overall description of the present specification.

FIG. 1 illustrates an example of a wireless charging system according to an example embodiment.

Referring to FIG. 1, a wireless charging system 100 includes a plurality of transmitters 110 and a receiver 120 which is wirelessly charged by the plurality of transmitters 110. Hereafter, although the receiver is illustrated as a mobile terminal in FIG. 1, the receiver 120 accurately means a module mounted on the inside and outside of the mobile terminal. Also, although FIG. 1 illustrates that the wireless charging system 100 includes the plurality of transmitters 110, it is not limited or defined thereto, and may include one transmitter. Also, the wireless charging system 100 may include a plurality of receivers.

Each of the plurality of transmitters 100 generates a power signal of each of a plurality of frequency bands, and then transmits the power signal of each of the plurality of frequency bands to the receiver 120. For example, each of the plurality of transmitters 110 may transmit all of a power signal of a first frequency band, a power signal of a second frequency band, and a power signal of a third frequency band which are different frequency bands to the receiver 120. Hereafter, the power signal of the plurality of frequency bands may be implemented as a form of pulse or CW (continuous wave), and the like.

Here, each of the plurality of transmitters 110 may allow the receiver 120 to use all of the power signal of each of the plurality of frequency bands by transmitting simultaneously all of the power signal of each of the plurality of frequency bands to the receiver 120.

Particularly, when the plurality of receivers is included in the wireless charging system 100, each of the plurality of transmitters 110 may allow each of the plurality of receivers to use all of the power signal of each of the plurality of frequency bands by transmitting all of the power signal of each of the plurality of frequency bands to each of the plurality of receivers. For example, each of the plurality of transmitters 110 may allow a first receiver to use the power signal of the first frequency band, the power signal of the second frequency band, and the power signal of the third frequency band in a process of charging and allow a second receiver to use the power signal of the first frequency band, the power signal of the second frequency band, and the power signal of the third frequency band in a process of charging by transmitting all of the power signal of each of the first frequency band, the second frequency band, and the third frequency band to each of the first receiver and the second receiver.

Also, each of the plurality of transmitters 110 may transmit only a power signal of a certain frequency band among the power signal of each of the plurality of frequency bands to the receiver 120 by receiving frequency information from the receiver 120. For example, each of the plurality of transmitters 110 may transmit only power signal of certain frequency bands except a corresponding frequency band among the power signal of each of the plurality of frequency bands to the receiver 120 by receiving frequency information including information for a frequency band that the receiver 120 currently uses from the receiver 120.

A detailed description relating to the each of the plurality of transmitters 100 will be made below with reference to FIGS. 2A to 3.

The receiver 120 may receive the power signal of each of the plurality of frequency bands from each of the plurality of transmitters 110, and then perform charging based on the power signal of each of the plurality of frequency bands by rectifying AC (alternating current) power applied to the power signal of each of the plurality of frequency bands to DC (direct current) power and converting the rectified DC power of the power signal of each of the plurality of frequency bands to DC power suitable for charging.

Particularly, the receiver 120 may use all of the power signal of each of the plurality of frequency bands in a process of charging by simultaneously rectifying all of the power signal of each of the plurality of frequency bands received from each of the plurality of transmitters 110. Accordingly, the receiver 120 may include a plurality of rectifiers simultaneously rectifying all of the power signal of the plurality of frequency bands.

Also, when only a power signal of a certain frequency band among the power signal of each of the plurality of frequency bands is received from each of the plurality of transmitters 110, the receiver 120 may selectively rectify only the power signal of the certain frequency bands among the power signal of each of the plurality of frequency bands and use it in a process of charging.

A detailed description relating to the receiver 120 will be made below with reference to FIGS. 4 to 7.

As described above, the wireless charging system 100 may allow the receiver 120 to use all of the received power signal of each of the plurality of frequency bands in a process of charging by allowing each of the plurality of transmitters 110 to transmit the power signal of each of the plurality of frequency bands.

Figure 2A:
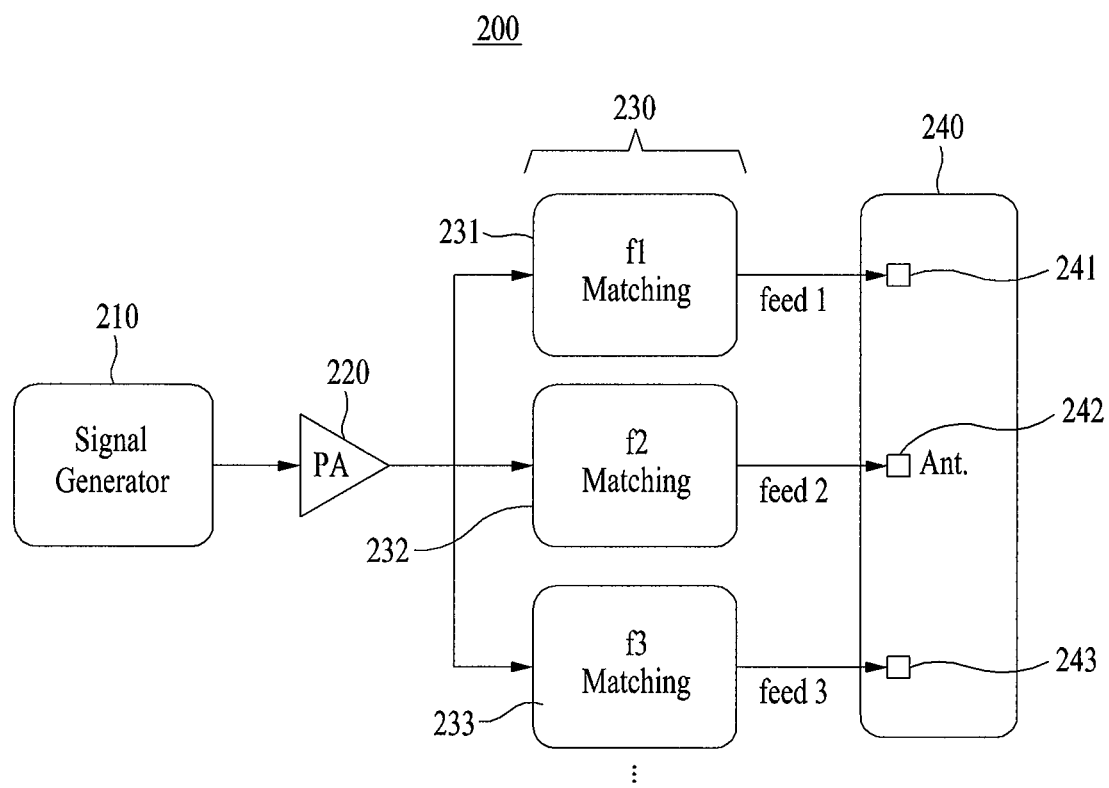
FIGS. 2A and 2B illustrate an example of a transmitter included in a wireless charging system according to an example embodiment.
Figure 2B:
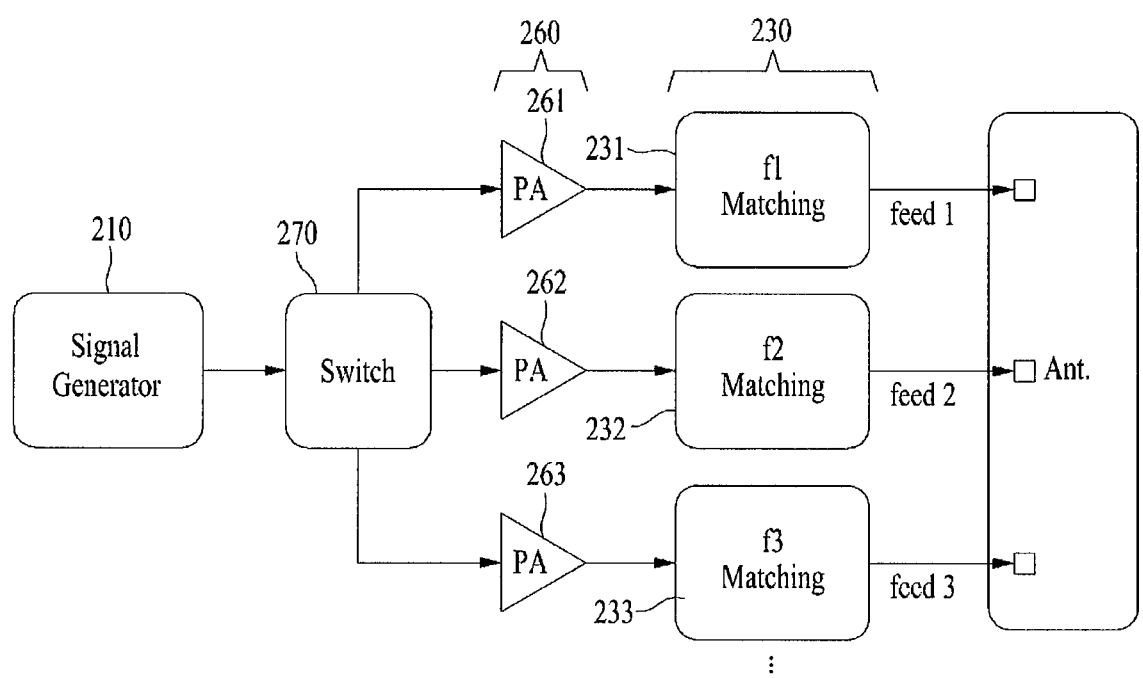
Figure 2C:
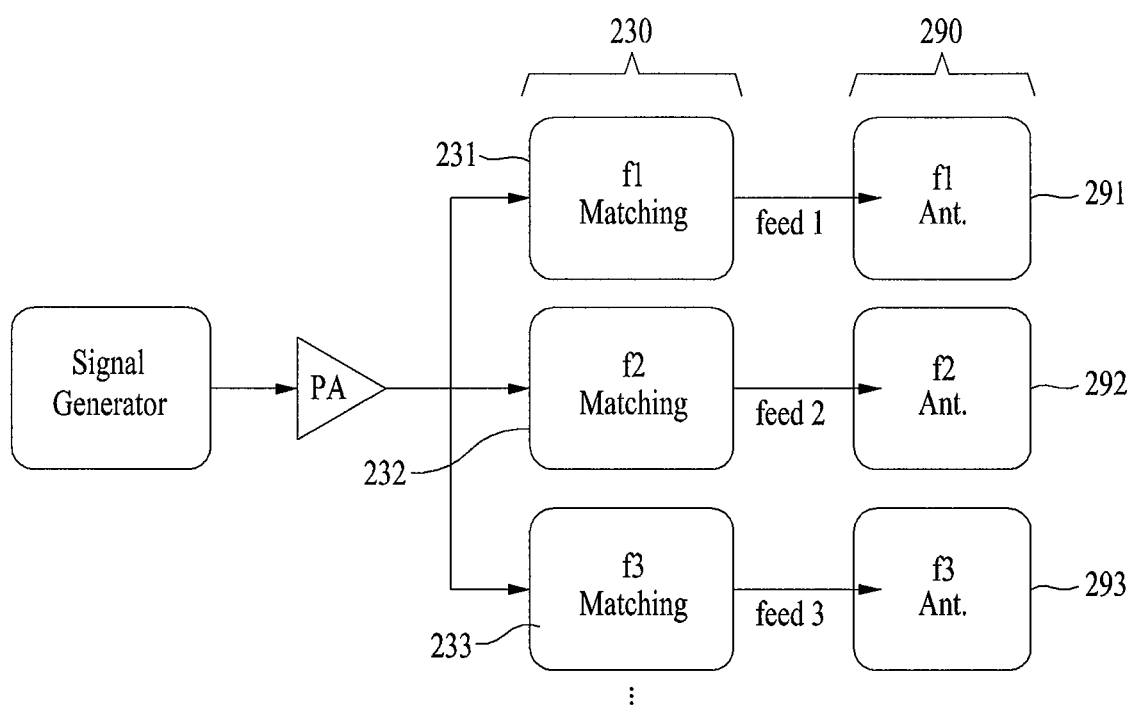
FIG. 2C illustrates an example of a transmitter included in a wireless charging system according to another example embodiment.

FIGS. 2A and 2B illustrate examples of a transmitter included in a wireless charging system according to an example embodiment, and FIG. 2C illustrates an example of a transmitter included in a wireless charging system according to another example embodiment.

Referring to FIG. 2A, a transmitter 200 may include a signal generator 210, a power amplifier 220, a plurality of matching units 230, and an antenna 240.

The signal generator 210 generates a power signal of each of a plurality of frequency bands. For example, the signal generator 210 may generate a power signal of a first frequency band, a power signal of a second frequency band, and a power signal of a third frequency band. Here, the signal generator 210 may generate sequentially (almost simultaneously) the power signal of each of the plurality of frequency bands. Hereafter, although the power signal of each of the plurality of frequency bands generated by the signal generator 210 may be in a state that the same value of power is applied, it is not limited or defined thereto, and may be in a state that different values of power are applied.

The power amplifier 220 may amplify the power signal of each of the plurality of frequency bands generated by the signal generator 210 and transmit the amplified power signal to the plurality of matching units 230.

The power amplifier 220 may be provided in multiple numbers corresponding to the number of the plurality of matching units 230 to be described later, and the transmitter 200 may further include a switch. A detailed description thereof will be made below with reference to FIG. 2B.

The plurality of matching units 230 may match and output the power signal of each of the plurality of frequency bands. Here, each of the plurality of matching unit 230 may feed for the signal of each of the plurality of frequency bands by being provided corresponding to the power signal of each of the plurality of frequency bands.

For example, when a power signal of a first frequency band, a power signal of a second frequency band, and a power signal of a third frequency band are generated and transmitted from the signal generator 210, a first matching unit 231 of the plurality of matching units 230 may match and output only the power signal of the first frequency band, a second matching unit 232 may match and output only the power signal of the second frequency band, and a third matching unit 233 may match and output only the power signal of the third frequency band.

The antenna 240 is connected to each of the plurality of matching units 230, and transmits the signal of each of the plurality of frequency bands to each of at least one receiver. Particularly, the antenna 240 may have different feeding positions 241, 242, 243 for the power signal of each of the plurality of frequency bands. For example, the antenna 240 may include a first feeding position 241 feeding the power signal of the first frequency band outputted from the first matching unit 231, a second feeding position 242 feeding the power signal of the second frequency band outputted by the second matching unit 232, and a third feeding position 243 feeding the power signal of the third frequency band outputted by the third matching unit 233. In this case, resonant frequencies are different each other for the each feeding positions 241, 242, 243.

Referring to FIG. 2B, a transmitter 250 has the same structure with the transmitter 200 described with reference to FIG. 2A, but there is a difference that a plurality of power amplifiers 260 and a switch 270 are included.

Here, the switch 270 may be located between the signal generator 210 and the plurality of power amplifiers 260, and selectively transmit the power signal of each of the plurality of frequency bands to the plurality of power amplifiers 260. Also, each of the plurality of power amplifiers 260 may amplify the power signal of each of the plurality of frequency bands and transmit the amplified power signal to a corresponding matching unit of the plurality of matching units 230. Accordingly, the plurality of power amplifiers 260 may be provided corresponding to the number of the plurality of matching units 230.

For example, when a power signal of a first frequency band, a power signal of a second frequency band, and a power signal of a third frequency band are generated and transmitted from the signal generator 210, the switch 270 may transmit the power signal of the first frequency band to a first power amplifier 261 (the first power amplifier 261 is a power amplifier corresponding to the first matching unit 231 of the plurality of matching units 230), transmit the power signal of the second frequency band to a second power amplifier 262 (the second power amplifier 262 is a power amplifier corresponding to the second matching unit 232 of the plurality of matching units 230), and transmit the power signal of the third frequency band to a third power amplifier 263 (the third power amplifier 263 is a power amplifier corresponding to the third matching unit 233 of the plurality of matching units 230).

Accordingly, the first power amplifier 261 may amplify the power of the first frequency band and transmit the amplified power signal to the first matching unit 231, the second power amplifier 262 may amplify the power of the second frequency band and transmit the amplified power signal to the second matching unit 232, and the third power amplifier 263 may amplify the power of the third frequency band and transmit the amplified power signal to the third matching unit 233.

Referring to FIG. 2C, a transmitter 280 has the same general structure with the transmitter 200 described with reference to FIG. 2A, but includes a plurality of antennas 290.

Here, each of the plurality of antennas 290 may be provided corresponding to the power signal of each of the plurality of frequency bands. Accordingly, the power signal of each of the plurality of frequency bands outputted from the plurality of matching units 230 included in the transmitter 280 may be transmitted to a corresponding antenna of the plurality of antennas 290.

For example, the power signal of the first frequency band outputted from the first matching unit 231 may be transmitted to a first antenna 291, the power signal of the second frequency band outputted from the second matching unit 232 may be transmitted to a second antenna 292, and the power signal of the third frequency band outputted from the third matching unit 233 may be transmitted to a third antenna 293.

Figure 3:
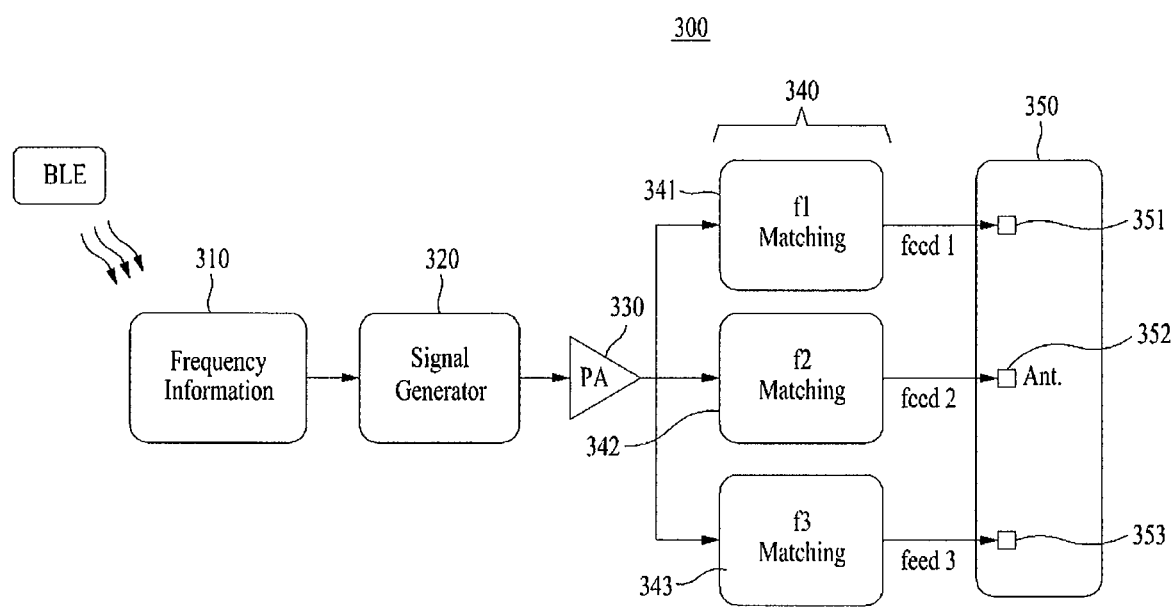
FIG. 3 illustrates an example of a transmitter included in a wireless charging system according to another example embodiment.

FIG. 3 illustrates an example of a transmitter included in a wireless charging system according to another example embodiment.

Referring to FIG. 3, a transmitter 300 may include a frequency information receiving unit 310, a signal generator 320, a power amplifier 330, a plurality of matching units 340, and an antenna 350.

The frequency information receiving unit 310 may receive frequency information from at least one receiver and transmit the frequency information to the signal generator 320.

The signal generator 320 selectively generates a power signal of each of a plurality of frequency bands based on the frequency information transmitted from the frequency information receiving unit 310. For example, when the frequency information that the frequency information receiving unit 310 receives frequency information that at least one receiver currently uses a power signal of a first frequency band (when the at least one receiver performs wireless charging with the power signal of the first frequency band received from another transmitter distinct from the transmitter 300) is received from the at least one receiver, the signal generator 320 may generate only a power signal of a second frequency band and a power signal of a third frequency band except the power signal of the first frequency band.

Accordingly, the power amplifier 330 may amplify the power signal of each of the plurality of frequency bands selectively generated by the signal generator 320 and transmit the amplified power signal to the plurality of matching units 340.

The plurality of matching units 340 may be driven only a part based on the power signal of each of the plurality of frequency bands selectively generated by the signal generator 320. For example, when the signal generator 320 generates only the power signal of the second frequency band and the power signal of the third frequency band, only a second matching unit 342 and a third matching unit 343 may be driven except for a first matching unit 341 among the plurality of matching units 340, and match and feed the power signal of the second frequency band and the power signal of the third frequency band to the antenna 350.

Accordingly, the antenna 350 may allow the at least one receiver to receive the power signal of each of the plurality of frequency bands by transmitting the power of each of the plurality of frequency bands outputted from the plurality of matching units 340.

Also, the transmitter 300 may include a plurality of antennas as the transmitter 250 described with reference to FIG. 2C. In this case, each of the plurality of antennas may be provided corresponding to the power signal of each of the frequency bands.

Likewise, the transmitter 300 may lower a work complexity and improve a work efficiency by generating a power signal of a certain frequency band in the signal generator 320 and driving a part of the plurality of matching units 340 according to control of the frequency information receiving unit 310.

Figure 4:
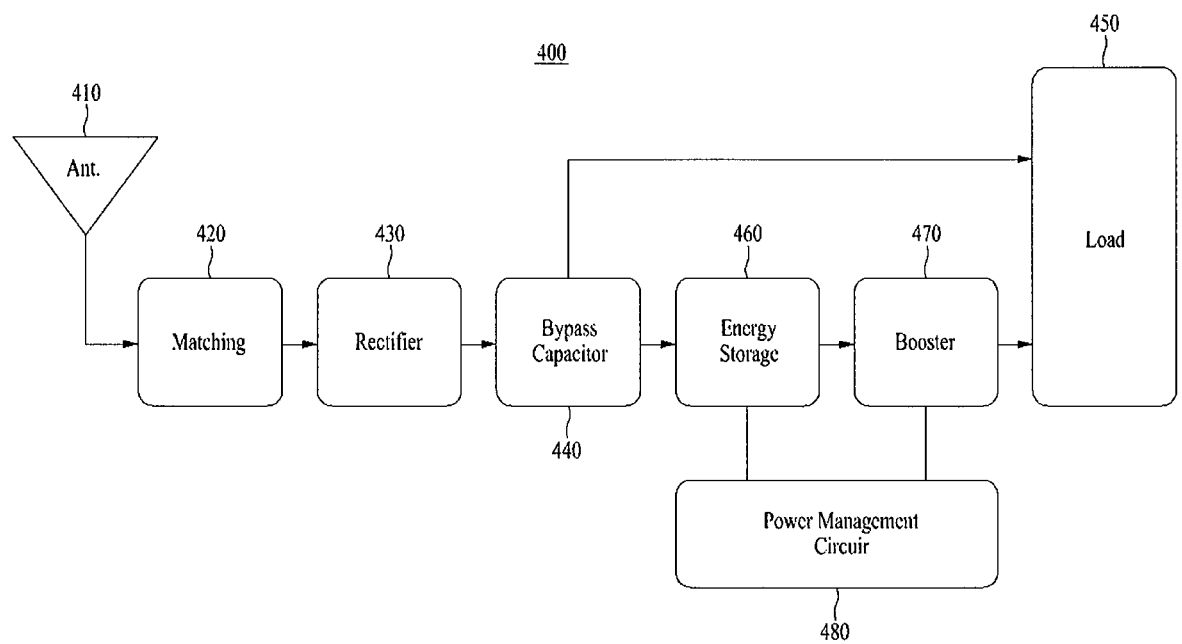
FIG. 4 illustrates an example of a receiver included in a wireless charging system according to an example embodiment.

FIG. 4 illustrates an example of a receiver included in a wireless charging system according to an example embodiment.

Referring to FIG. 4, a receiver 400 has a structure essentially including at least one antenna 410, a plurality of matching units 420, and a plurality of rectifiers 430.

The at least one antenna 410 receives a power signal of each of a plurality of frequency bands from each of at least one transmitter, and feeds the power signal to the plurality of matching units 420.

The plurality of matching units 420 is connected to the at least one antenna 410, and matches and outputs the power signal of each of the plurality of frequency bands.

The plurality of rectifiers 430 may be connected to the at least one antenna 410, and rectify AC power applied to the power signal of each of the plurality of frequency bands to DC power.

The DC power outputted from the plurality of rectifiers 430 may be outputted from a loading unit 450 so as to be directly used in a process of charging through a bypass capacitor 440 or may be outputted from the loading unit 450 after being converted to DC power suitable for charging through the bypass capacitor 440, an energy storage 460, and a booster 470.

Accordingly, the receiver 400 may have a structure including the at least one antenna 410, the plurality of matching units 420, the plurality of rectifiers 430, the bypass capacitor 440, and the loading unit 450, or a structure including the at least one antenna 410, the plurality of matching units 420, the plurality of rectifiers 430, the bypass capacitor 440, the energy storage 460, the booster 470, a power management circuit 480, and the loading unit 450.

Hereafter, although the receiver is described as a structure including the booster 470, it is not limited or defined thereto, and a structure not including the booster 470 may be identical in operation of the at least one antenna 410, the plurality of matching units 420, and the plurality of rectifiers 430.

Figure 5:
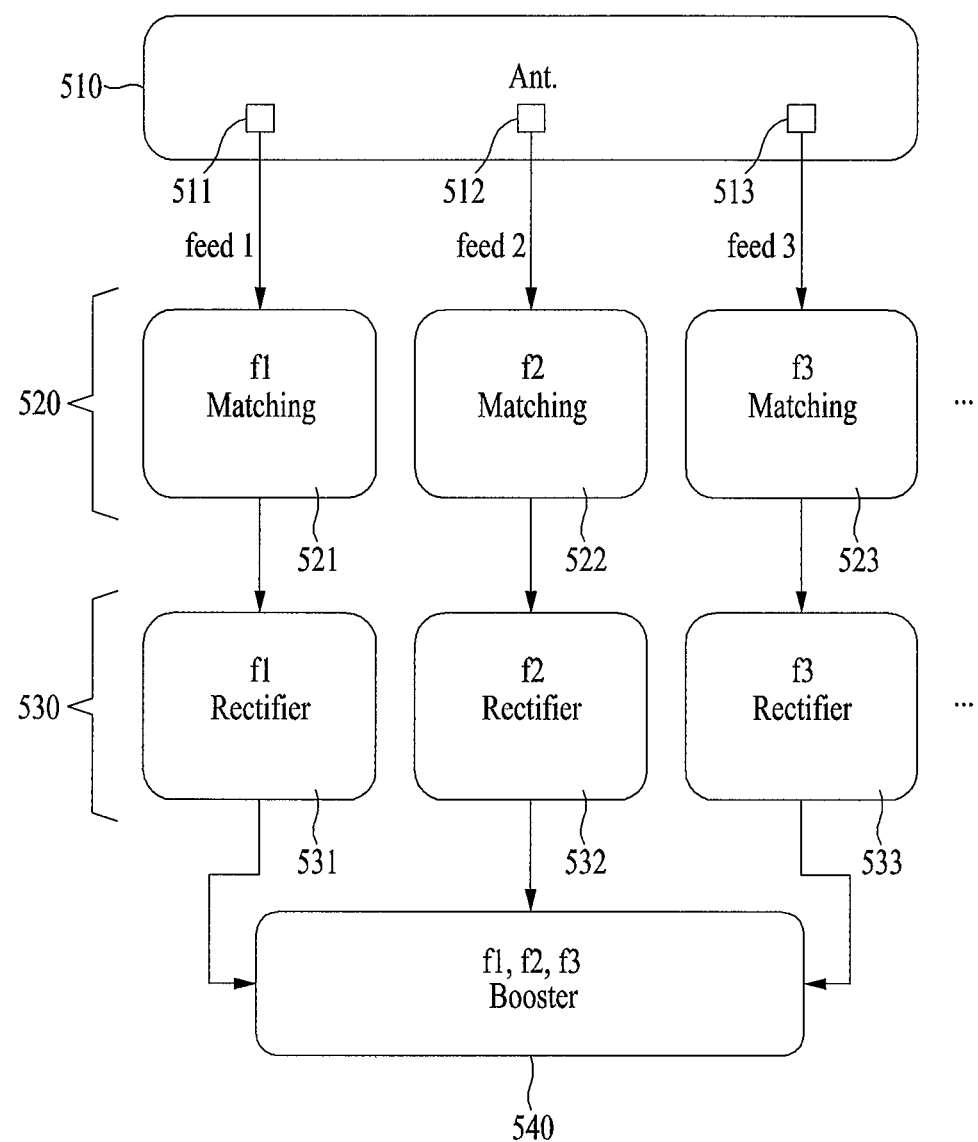
FIG. 5 illustrates an example of a receiver included in a wireless charging system according to an example embodiment.

FIG. 5 illustrates an example of a receiver included in a wireless charging system according to an example embodiment.

Referring to FIG. 5, a receiver 500 may include an antenna 510, a plurality of matching units 520, a plurality of rectifiers 530, and a booster 540.

The antenna 510 receives a power signal of each of a plurality of frequency bands from each of at least one transmitter. Here, the antenna 510 may have different feeding positions 511, 512, 513 for the power signal of each of the plurality of frequency bands. For example, the antenna 510 may have a first feeding position 511 received a power signal of a first frequency band, a second feeding position 512 received a power signal of a second frequency band, and a third feeding position 513 received a power signal of a third frequency band. In this case, resonant frequencies are different each other for the each feeding positions 511, 512, 513.

The plurality of matching units 520 is connected to the antenna 510, and matches and outputs the power signal of each of the plurality of frequency bands fed from the antenna 510. Here, the plurality of frequency bands may be provided corresponding to the power signal of each of the plurality of frequency bands.

For example, when the power signal of the first frequency band, the power signal of the second frequency band, and the power signal of the third frequency band are received from the antenna 510, a first matching unit 521 of the plurality of matching units 520 may match and output only the power signal of the first frequency band, a second matching unit 522 may match and output only the power signal of the second frequency band, and a third marching unit 523 may match and output only the power signal of the third frequency band.

The plurality of rectifiers 530 may be connected to the plurality of matching units 520, and provided corresponding to the power signal of each of the plurality of frequency bands. Accordingly, each of the plurality of rectifiers 530 may rectify AC power applied to the power signal of each of the plurality of frequency bands to DC power.

Here, each of the plurality of rectifiers 530 may be provided corresponding to the power signal of each of the plurality of frequency bands. Accordingly, the each of the plurality of rectifiers 530 may rectify AC power applied to a power signal of a corresponding frequency band among the power signal of each of the plurality of frequency bands to DC power. For example, a first rectifier 531 may rectify AC power applied to the power signal of the first frequency band outputted from the first matching unit 521 to DC power, a second rectifier 532 may rectify AC power applied to the power signal of the second frequency band outputted from the second matching unit 522 to DC power, and a third rectifier 533 may rectify AC power applied to the power signal of the third frequency band outputted from the third matching unit 523 to DC power.

The booster 540 may be connected to each of the plurality of rectifiers 530, and convert DC power of the power signal of each of the plurality of frequency bands to DC power suitable for charging.

Figure 6:
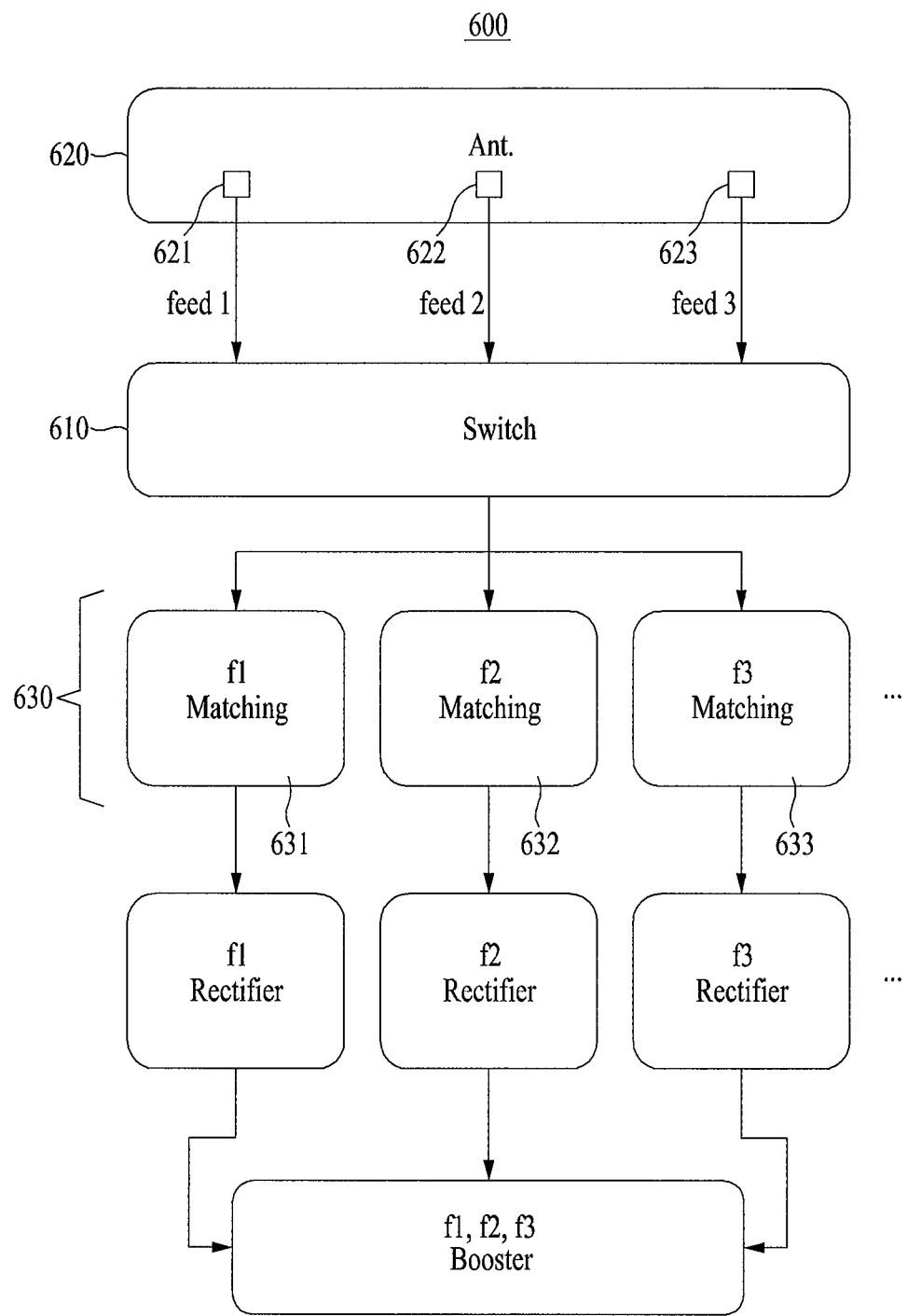
FIG. 6 illustrates an example of a receiver included in a wireless charging system according to another example embodiment.

FIG. 6 illustrates an example of a receiver included in a wireless charging system according to another example embodiment.

Referring to FIG. 6, a receiver 600 has the same structure with the receiver described with reference to FIG. 5, but there is a difference that a switch 610 is further included.

The switch 610 may be located between an antenna 620 and a plurality of matching units 630, and selectively transmit a power signal of each of a plurality of frequency bands transmitted from the antenna 620 to the plurality of matching units 630.

For example, when a power signal of a first frequency band and a power signal of a second band are received from a first feeding position 621 and a second feeding position 622 of different feeding positions 621, 622, 623 included in the antenna 620 and fed to the switch 610, the switch 610 may selectively transmit the power signal of the first frequency band and the power signal of the second frequency band to a first matching unit 631 and a second matching unit 632.

Accordingly, the receiver 600 may lower a work complexity and improve a work efficiency by selectively operating the plurality of matching units 630 and the plurality of rectifiers 640 according to the power signal of each of the plurality of frequency bands received from each of the at least one transmitter.

Figure 7:
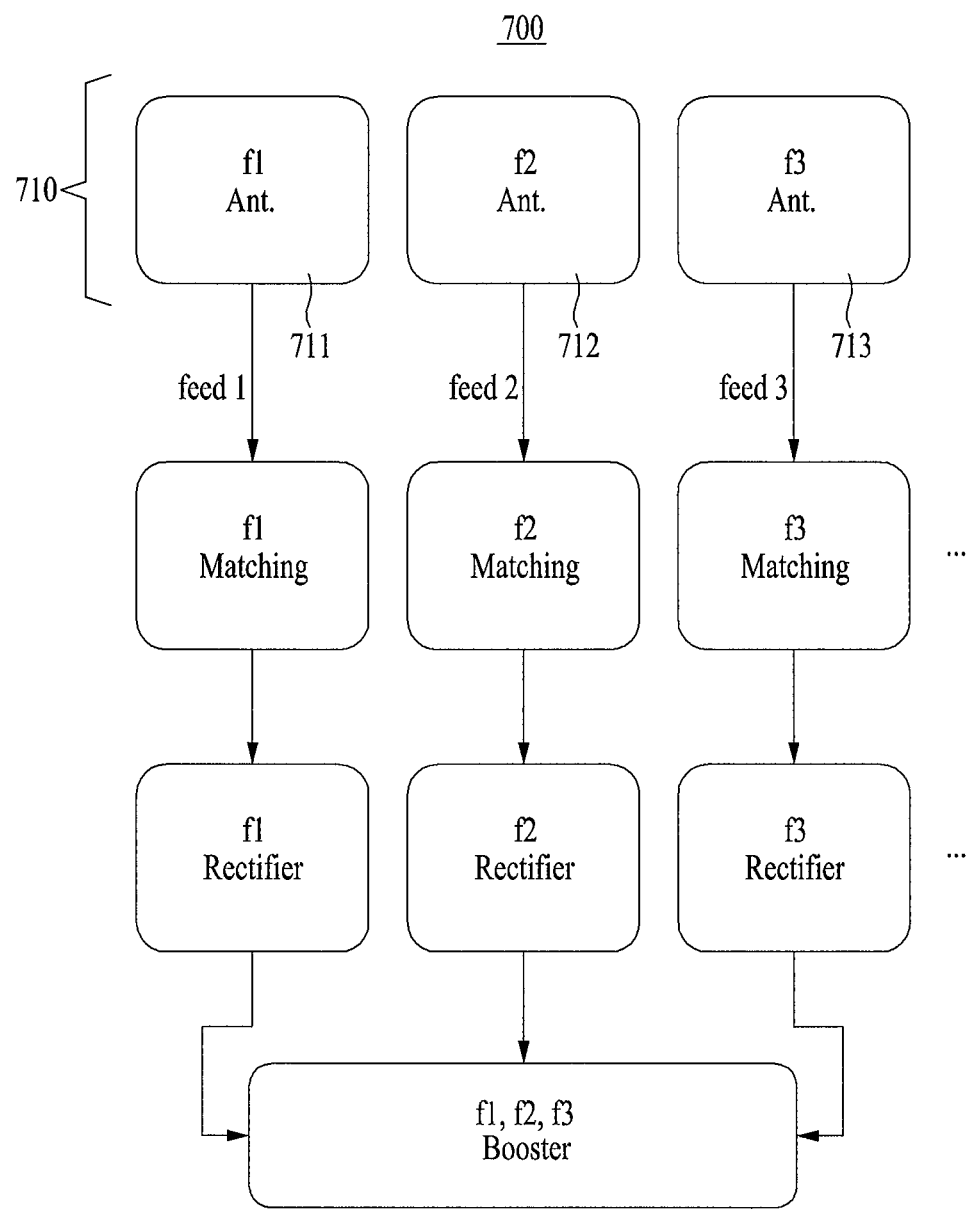
FIG. 7 illustrates an example of a receiver included in a wireless charging system according to another example embodiment.

FIG. 7 illustrates an example of a receiver included in a wireless charging system according to another example embodiment.

Referring to FIG. 7, a receiver 700 has the same structure with the receiver described with reference to FIG. 5, but there is a difference that a plurality of antennas 710 is included.

Here, each of the plurality of antennas 710 may be provided corresponding to a power signal of each of a plurality of frequency bands. Accordingly, the power signal of each of the plurality of frequency bands transmitted from each of at least one transmitter may be received to different antennas 711, 712, 713 for each frequency bands.

For example, a first antenna 711 may receive a power signal of a first frequency band, a second antenna 712 may receive a power signal of a second frequency band, and a third antenna 713 may receive a power signal of a third frequency band.

Likewise, the receiver 700 may further include the switch included in the receiver described with reference to FIG. 6. A detailed description thereof is described above with reference to FIG. 6, therefore, it will be omitted.

Figure 8:
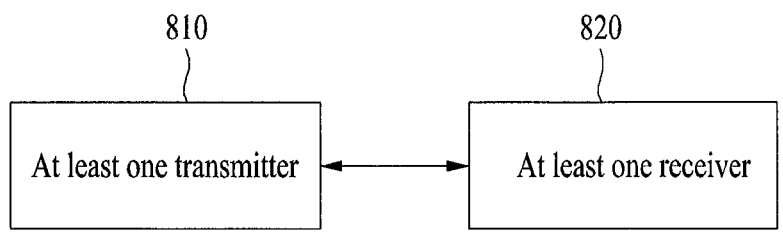
FIG. 8 is a block diagram illustrating a wireless charging system according to an example embodiment.

FIG. 8 is a block diagram illustrating a wireless charging system according to an example of embodiment.

Referring to FIG. 8, a wireless charging system includes at least one transmitter 810 and at least one receiver 820 wirelessly charged by the at least one transmitter 810.

The at least one transmitter 810 may transmit a power signal of each of a plurality of frequency bands to the at least one receiver 820, and the at least one receiver 820 may receive the power signal of each of the plurality of frequency bands and use the received power signal in a process of charging. A detailed description thereof will be made below with reference to FIGS. 9 and 10.

Figure 9:
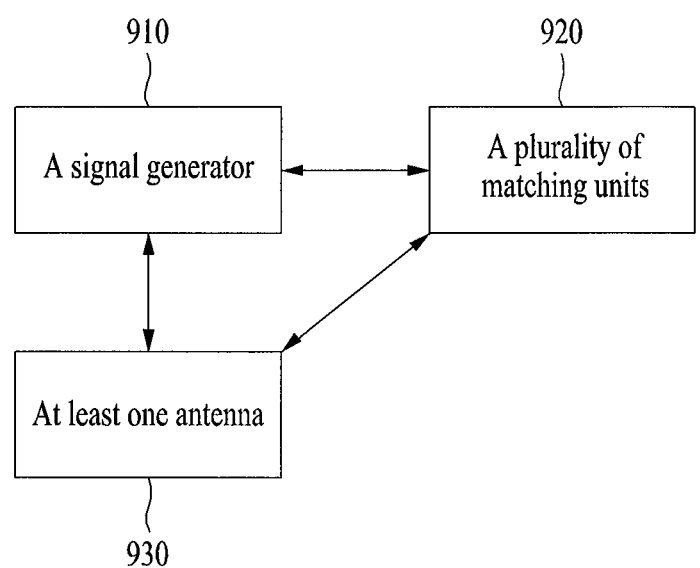
FIG. 9 is a block diagram illustrating at least one transmitter illustrated in FIG. 8.

FIG. 9 is a block diagram illustrating at least one transmitter illustrated in FIG. 8.

Referring to FIG. 9, at least one transmitter includes a signal generator 910, a plurality of matching units 920, and at least one antenna 930.

The signal generator 910 generates a power signal of each of a plurality of frequency bands.

The plurality of frequency bands is connected to the signal generator 910, and matches and outputs the power signal of each of the plurality of frequency bands. Here, each of the plurality of matching units 920 may be provided corresponding to the power signal of each of the plurality of frequency bands. For example, the number of the plurality of matching units 920 may be provided corresponding to the number of the power signal of each of the plurality of frequency bands.

Here, it is not described in FIG. 9, but at least one power amplifier amplifying the power signal of each of the plurality of frequency bands may be provided between the signal generator 910 and the plurality of matching units 920.

Here, the at least one power amplifier may be provided in multiple numbers corresponding to the number of the plurality of matching units 920.

In this case, a switch selectively transmitting the power signal of each of the plurality of frequency bands to a plurality of power amplifiers may be provided between the signal generator 910 and the plurality of power amplifiers.

The at least one antenna 930 is connected to the plurality of matching units 920 and transmits the power signal of each of the plurality of frequency bands to each of the at least one receiver.

Here, when the at least one antenna 930 is provided one, the one antenna may have different feeding positions for the power signal of each of the plurality of frequency bands.

Also, when at least one antenna 930 is provided in multiple numbers, each of the plurality of antennas may be provided corresponding to the power signal of each of the plurality of frequency bands.

Also, it is not described in FIG. 9, the wireless charging system may further include a frequency information receiving unit receiving frequency information from the at least one receiver. In this case, the frequency information receiving unit may be located in front of the signal generator 910, and allow the signal generator 910 to selectively generate the power signal of each of the plurality of frequency bands based on the frequency information transmitted from the frequency information receiving unit.

Figure 10:
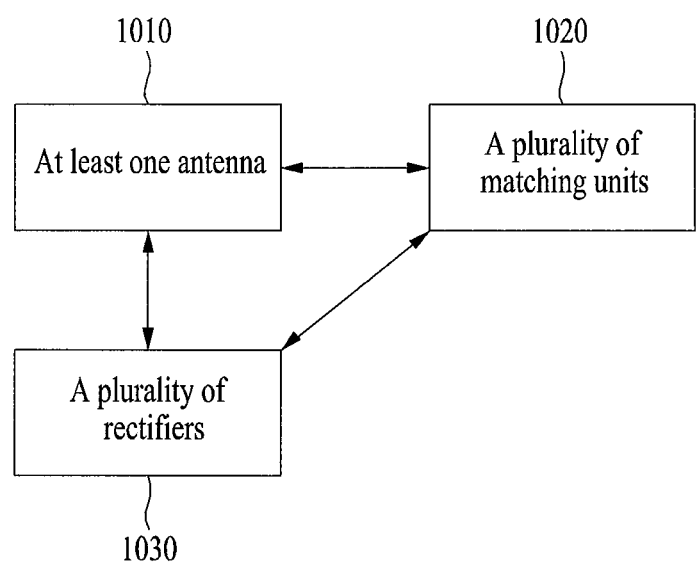
FIG. 10 is a block diagram illustrating at least one receiver illustrated in FIG. 8.

FIG. 10 is a block diagram illustrating at least one receiver illustrated in FIG. 8.

Referring to FIG. 10, at least one receiver includes at least one antenna 1010, a plurality of matching units 1020, and a plurality of rectifiers 1030.

The at least one antenna 1010 receives a power signal of each of a plurality of frequency bands from at least one transmitter.

Here, when the at least one antenna 1010 is provided one, the one antenna may have different feeding positions for the power signal of each of the plurality of frequency bands.

Also, when the at least one antenna 1010 is provided in multiple numbers, each of the plurality of antennas may be provided corresponding to the power signal of each of the plurality of frequency bands.

The plurality of matching units 1020 is connected to the at least one antenna 1010, matches and outputs the power signal of each of the plurality of frequency bands. Here, each of the plurality of matching units 1020 may be provided corresponding to the power signal of each of the plurality of frequency bands. For example, the number of the plurality of matching units 1020 may be provided to be corresponded to the number of the power signal of each of the plurality of frequency bands.

Here, it is not described in FIG. 10, but a switch selectively transmitting the power signal of each of the plurality of frequency bands transmitted from the at least one antenna 1010 to the plurality of matching units 1020 may be further provided between the at least one antenna 1010 and the plurality of matching units 1020.

The plurality of rectifiers 1030 is connected to the plurality of matching units 1020 and rectifies AC power applied to the power signal of each of the plurality of frequency bands to DC power. Here, each of the plurality of rectifiers 1030 may be provided corresponding to the power signal of each of the plurality of frequency bands. For example, the number of the plurality of rectifiers 1030 may be provided to be corresponded to the number of the power signal of each of the plurality of frequency bands.

Also, it is not described in FIG. 10, but the wireless charging system may be connected to each of the plurality of rectifiers 1030 and further include a booster converting DC power of the power signal of each of the plurality of frequency bands to DC power suitable for charging.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. At least one transmitter used in a wireless charging system of using multi-frequency, the at least one transmitter comprising:
   a signal generator configured to generate a power signal of a respective one of a plurality of frequency bands;
   a plurality of matching units connected to the signal generator configured to match and output the power signal of a respective one of the plurality of frequency bands; and
   a single antenna connected to the plurality of matching units configured to transmit the power signal of a respective one of the plurality of frequency bands to each of at least one receiver,
   wherein the antenna has different feeding positions for the power signal of a respective one of the plurality of frequency bands.

2. The at least one transmitter of claim 1, wherein each of the plurality of matching units is provided corresponding to the power signal of a respective one of the plurality of frequency bands.

3. The at least one transmitter of claim 1, further comprising a frequency information receiving unit configured to receive frequency information from the at least one receiver,
   wherein the signal generator generates selectively the power signal of a respective one of the plurality of frequency bands based on the frequency information transmitted from the frequency information receiving unit.

4. The at least one transmitter of claim 1, further comprising at least one power amplifier located between the signal generator and the plurality of matching units amplifying the power signal of a respective one of the plurality of frequency bands.

5. The at least one transmitter of claim 4, wherein when the at least one power amplifier is provided in multiple numbers, each of the plurality of power amplifiers is provided corresponding to the number of the plurality of matching units,
   wherein the at least one transmitter further comprises a switch located between the signal generator and the plurality of power amplifiers transmitting selectively the power signal of a respective one of the plurality of frequency bands to the plurality of the power amplifiers.

6. A wireless charging system of using multi-frequency, comprising at least one transmitter and at least one receiver charged wirelessly by the at least one transmitter, wherein the at least one transmitter comprises:

a signal generator configured to generate a power signal of a respective one of a plurality of frequency bands;

a plurality of matching units connected to the signal generator configured to match and output the power signal of a respective one of the plurality of frequency bands; and an antenna connected to the plurality of matching units configured to transmit the power signal of a respective one of the plurality of frequency bands to each of the at least one receiver, wherein the one antenna has different feeding positions for the power signal of a respective one of the plurality of frequency bands, wherein the at least one receiver comprises:

a single antenna configured to receive the power signal of a respective one of the plurality of frequency bands from each of the at least one transmitter;

a plurality of matching units connected to the antenna configured to match and output the power signal of a respective one of the plurality of frequency bands; and a plurality of rectifiers connected to the plurality of matching units rectifying AC power applied to the power signal of a respective one of the plurality of frequency bands to DC power.

7. The system of claim 6, wherein each of the plurality of rectifiers and each of the plurality of matching units included in the at least one receiver are provided corresponding to the power signal of a respective one of the plurality of frequency bands.

* * * * *